(12) United States Patent
Lake

(10) Patent No.: US 6,522,023 B2
(45) Date of Patent: Feb. 18, 2003

(54) RADIO FREQUENCY-TRANSMISSIVE COMPOSITIONS, METHODS OF FORMING RADIO FREQUENCY-TRANSMISSIVE COMPOSITIONS, MICROELECTRONIC DEVICES, WIRELESS RADIO FREQUENCY COMMUNICATION DEVICES, AND METHODS OF FORMING MICROELECTRONIC DEVICES, WIRELESS RADIO FREQUENCY COMMUNICATION DEVICES

(75) Inventor: Rickie C. Lake, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 13 days.

(21) Appl. No.: 09/839,550

(22) Filed: Apr. 20, 2001

(65) Prior Publication Data

US 2001/0031630 A1 Oct. 18, 2001

Related U.S. Application Data

(62) Division of application No. 09/525,567, filed on Mar. 15, 2000, now Pat. No. 6,376,922, which is a division of application No. 08/911,309, filed on Aug. 14, 1997, now Pat. No. 6,114,447.

(51) Int. Cl.$^7$ .................... H01L 23/29; H01L 21/47; H01L 21/48; H01L 21/52; B05D 5/12
(52) U.S. Cl. ................. 257/789; 257/787; 257/793; 257/795; 427/96; 427/385.5; 438/106; 438/125; 438/126; 438/127; 438/758; 455/347
(58) Field of Search ................. 438/106, 125, 438/126, 127, 758; 427/96, 385.5; 257/789, 787, 793, 795; 455/347

(56) References Cited

U.S. PATENT DOCUMENTS

| | | |
|---|---|---|
| 4,075,632 A | 2/1978 | Baldwin et al. |
| 4,472,556 A | 9/1984 | Lipowitz et al. |
| 4,926,182 A | 5/1990 | Ohta et al. |
| 4,990,556 A | 2/1991 | Shimizu et al. |
| 5,019,604 A | 5/1991 | Lemole |
| 5,378,403 A | 1/1995 | Shacklette |
| 5,617,297 A | 4/1997 | Lo et al. |
| 5,621,412 A | 4/1997 | Sharpe et al. |
| 5,649,296 A | 7/1997 | MacLellan et al. |
| 5,725,707 A | 3/1998 | Koon et al. |
| 5,963,177 A | * 10/1999 | Tuttle et al. ............... 340/10.1 |

* cited by examiner

Primary Examiner—Robert Dawson
Assistant Examiner—Jeffrey B. Robertson
(74) Attorney, Agent, or Firm—Wells St. John P.S.

(57) ABSTRACT

Radio frequency-transmissive compositions having reduced dissipation factors, microelectronic devices, and in particular, wireless radio frequency communication devices which utilize such compositions, and methods of forming the same are described. In one implementation, a liquid resin is provided and a solid organic polymer filler material is provided within the resin to impart a degree of radio frequency. transmissivity which is greater than that of the resin alone, i.e. the composition has a reduced dissipation factor. An exemplary resin comprises epoxy and an exemplary filler material is a polytetrafluoroethylene powder. In another implementation, such composition is formed or applied over a substrate which includes an antenna formed thereon and cured to provide a solid coating. The substrate can also have integrated circuitry and a battery mounted thereon to provide a wireless communication device. In such a case, the composition can be formed over and cured atop the integrated circuitry and the battery.

33 Claims, 2 Drawing Sheets

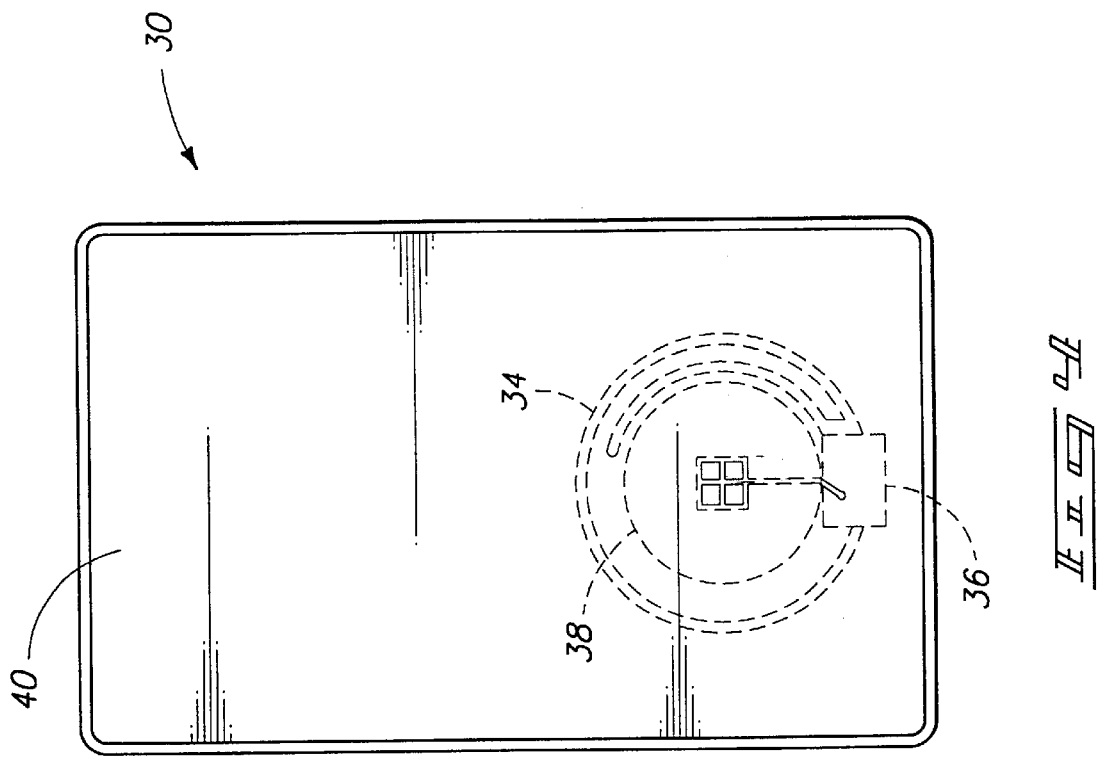
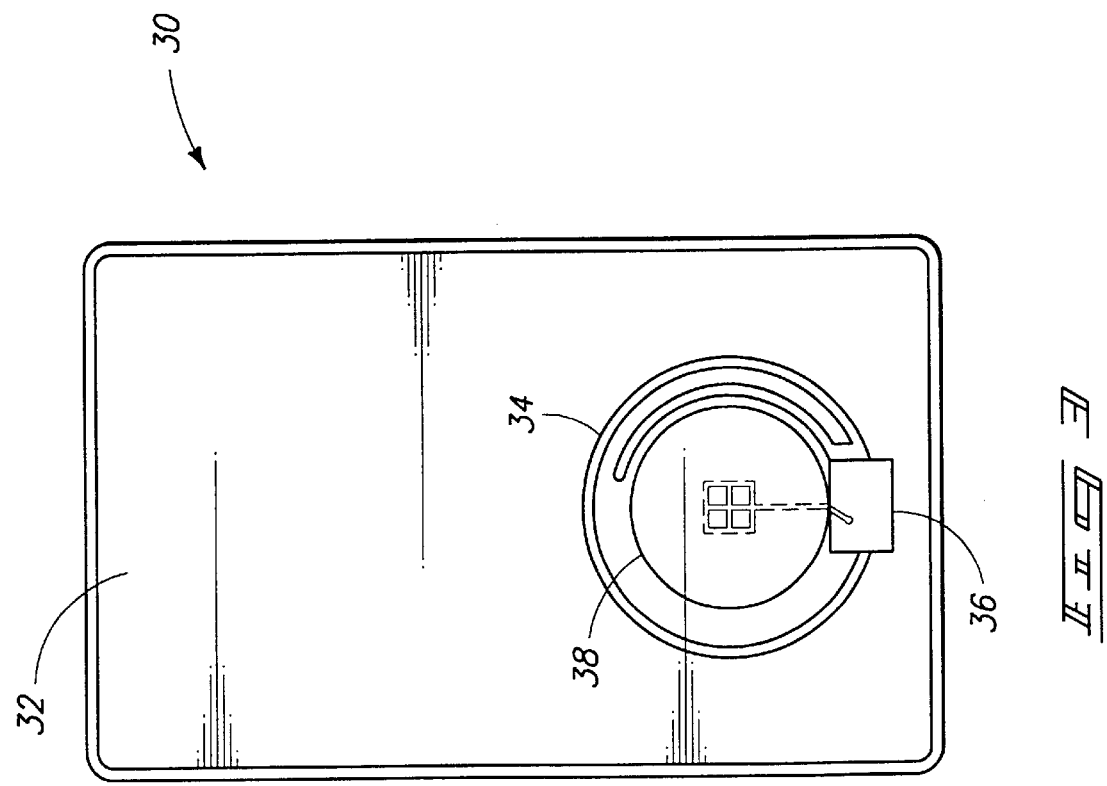

RADIO FREQUENCY-TRANSMISSIVE COMPOSITIONS, METHODS OF FORMING RADIO FREQUENCY-TRANSMISSIVE COMPOSITIONS, MICROELECTRONIC DEVICES, WIRELESS RADIO FREQUENCY COMMUNICATION DEVICES, AND METHODS OF FORMING MICROELECTRONIC DEVICES, WIRELESS RADIO FREQUENCY COMMUNICATION DEVICES

This is a divisional application of U.S. patent application Ser. No. 09/525,567, filed on Mar. 15, 2000, issued as U.S. Pat. No. 6,376,922, which resulted from a divisional application of U.S. patent application Ser. No. 08/911,309, filed on Aug. 14, 1997, issued as U.S. Pat. No. 6,114,447 on Sep. 5, 2000.

TECHNICAL FIELD

This invention relates to radio frequency-transmissive compositions having reduced dissipation factors and methods of forming the same. The invention also concerns microelectronic devices, and in particular, wireless radio frequency communication devices which utilize such compositions, and methods of forming the same.

BACKGROUND OF THE INVENTION

Some microelectronic devices are designed for wireless communication. Typically, such devices operate within a desired range of radio frequencies. In designing such devices, consideration must be given to the various materials which are utilized because of their potential to adversely impact device operation and performance. For example, some wireless microelectronic devices include antennas which is are utilized to send and receive electronic signals which fall within the desired range of frequencies. These antennas can be covered with a material which serves to protect the antenna from the external environment. Yet in protecting the antenna, such materials by virtue of their physical characteristics may undesirably affect the ability of the device (and antenna) to transmit and receive electronic signals within the desired range of radio frequencies, i.e. such material may cause the signals to be attenuated or undesirably dissipated. Such materials can also affect the electromagnetic characteristics of such antennas such as the antenna's resonant frequency.

Some microelectronic communication devices are very small and can be covered with a protectant which effectively seals the device. As with those materials which can adversely affect an antenna's operation by covering all or a portion thereof, such protectants can also have an impact on overall device operation. Thus it is not enough to select a protectant which only serves to protect or seal the device. Rather, the designer must consider all of the operation-impacting ramifications of a particular material when it is selected for use with a particular device.

This invention arose out of concerns associated with providing materials and methods of forming materials which have desirable radioi frequency transmissivity characteristics. This invention also arose out of concerns associated with providing microelectronic devices, and in particular, wireless radio frequency communication devices which utilize such materials, and methods of forming the same.

SUMMARY OF THE INVENTION

Radio frequency-transmissive compositions having reduced dissipation factors, microelectronic devices, and in particular, wireless radio frequency communication devices which utilize such compositions, and methods of forming the same are described. In one implementation, a liquid resin is provided and a solid organic polymer filler material is provided within the resin to impart a degree of radio frequency transmissivity which is greater than that of the resin alone, i.e. the composition has a reduced dissipation factor. An exemplary resin comprises epoxy and an exemplary filler material is a polytetrafluoroethylene powder. In another implementation, such composition is formed or applied over a substrate which includes an antenna formed thereon and cured to provide a solid coating. The substrate can also have integrated circuitry and a battery mounted thereon to provide a wireless communication device. In such a case, the composition can be formed over and cured atop the integrated circuitry and the battery.

BRIEF DESCRIPTION OF THE DRAWINGS

Preferred embodiments of the invention are described below with reference to the following accompanying drawings.

FIG. 2 is a flow diagram which illustrates certain methodical aspects of the invention.

FIG. 4 is a top plan view of the FIG. 3 device at a processing step subsequent to that shown in FIG. 3.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
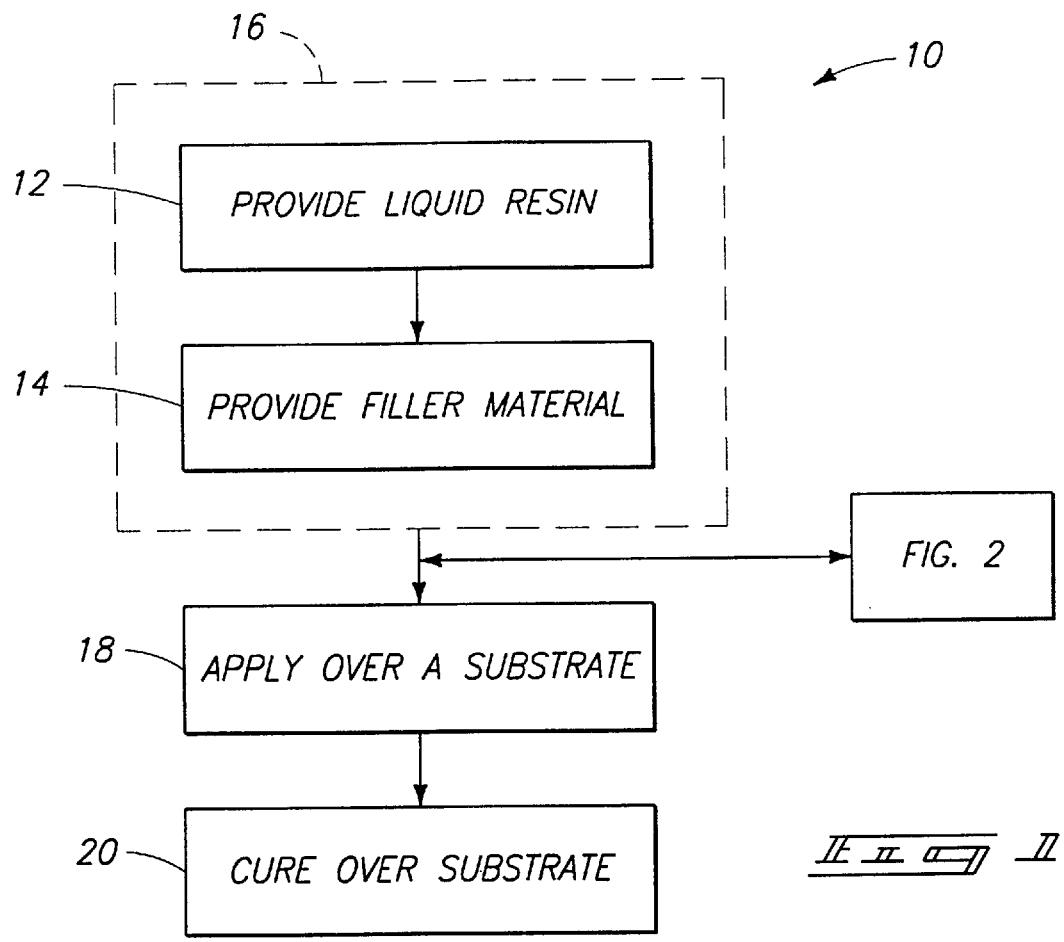
FIG. 1 is a flow diagram which illustrates certain methodical aspects of the invention.

Referring to FIG. 1, a flow diagram illustrates certain methodical aspects of the invention generally at 10. A liquid resin or encapsulating material which is radio frequency transmissive to a first degree is provided at 12. Such resin has a first radio frequency dissipation factor. Exemplary resins include various epoxies, urethane, acrylic, polyester, and/or silicone. The resin can also include a hardener. As used in this document, the term "resin" will be understood to include resins, such as those mentioned above, which may or may not include a hardener or hardening agent. An exemplary epoxy resin is R3500 available from Epic Resins, Inc. of Palmyra, Wis. An exemplary Epic Resin hardener is H5039. The hardener can also comprise a pre-blended hardener having constituent parts of Epic Resin H5064 (25%) and K2400 (75%). Another exemplary resin is Grace Specialty Polymers Stycast® #1267 which is available through W.R. Grace & Co. of Atlanta, Ga.

Filler material is provided into or within the liquid resin at 14 to form a resin composition at 16 which is radio frequency transmissive to a second degree which is greater than the first degree. Accordingly, the resin composition has a second radio frequency dissipation factor which is less than the first dissipation factor. In a preferred implementation, such filler material constitutes a solid, such as an organic polymer powder which is provided into the liquid resin in solid form and constitutes a plurality of particles which are suspended therewithin. Such suspended particles can have exemplary sizes from between 1–25 μm.

Exemplary materials for the organic polymer filler include the following polytetrafluoroethylene, fluorinated ethylene propylene, polypropylene, polystyrene, and/or polybutylene, with powdered polytetrafluoroethylene being preferred. An exemplary powdered polytetrafluoroethylene material is MP1100 Teflon® powder which is available from DuPont. The manufacturer of the resin could of course supply the filler material premixed in the resin, hardener, or resin/hardener composition.

The preferred resin composition or liquid mixture (pre-cure) preferably comprises between about 10% to 90% by volume of the organic polymer filler material and even more preferably, between about 40% to 70%. Such provides a flowable mixture which is formed or applied at 18 over a suitable substrate, an exemplary one of which is described in more detail below in connection with FIG. 2. An exemplary flowable mixture comprises the Epic Resin resin R3500 with a pre-blended hardener having constituent parts of Epic Resin hardener H5064 (25%) and K2400 (75%), with a 14% by-weight concentration of the DuPont MP1100 Teflon® powder. Thereafter, such flowable mixture can be exposed to conditions at 20 which are effective to harden the flowable mixture into a solid mass or rigidified coating thereover.

Referring to FIG. 2, a substrate is provided at 22. An exemplary substrate comprises a polyester film having a thickness of around 5 mils. An antenna is provided over or on the substrate at 24. In a preferred embodiment, such antenna is formed from conductive antenna-forming material which is printed on the substrate. Such antenna-forming material can constitute any suitable conductive material, with an exemplary material being a silver-filled material. Integrated circuitry can also be provided over or mounted on the substrate and operably connected with the antenna at 26. The integrated circuitry can be configured for radio frequency operation within a desired range of frequencies. In one aspect, the integrated circuitry constitutes at least one circuit comprising a radio frequency receiver and transmitter. A battery can also be provided at 28 and supported by the substrate. Such battery is preferably operably connected with the integrated circuitry to provide power thereto.

Figure 3:
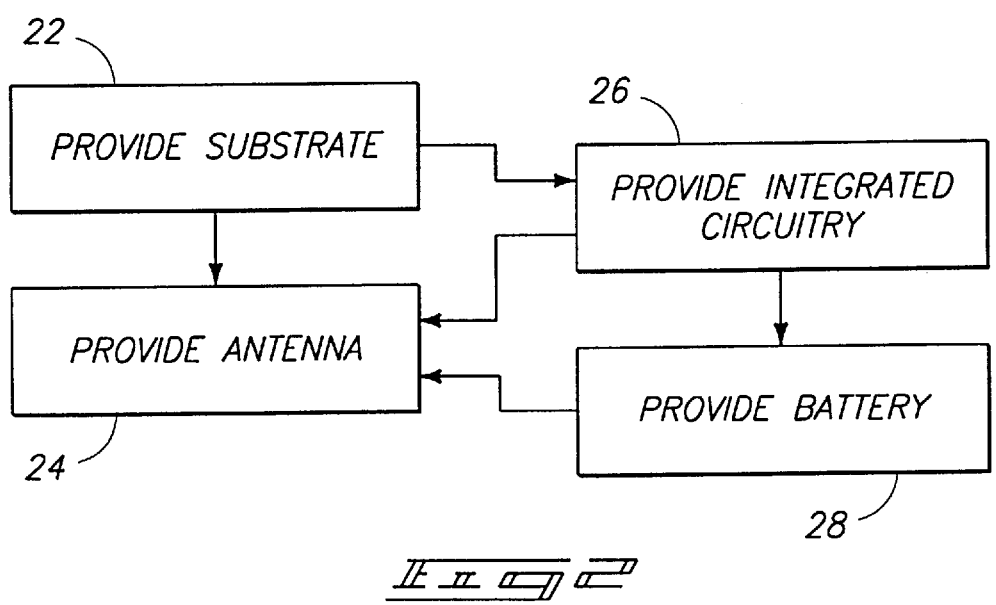
FIG. 3 is a top plan view of a wireless communication device constructed in accordance with one aspect of the present invention.

Referring to FIG. 3, an exemplary micro electronic radio frequency communication device is shown at 30 and includes a substrate 32 and an antenna 34 which is formed thereover as discussed above. Integrated circuitry, in the form of a semiconductor chip 36, is mounted on and supported by substrate 32. Antenna 34 is operably connected with semiconductor chip 36 and configured therewith to operate relative to desired radio frequencies. A exemplary range of frequencies can be between 1 GHz and 30 GHz. More preferably, the desired frequency of operation is about 2.45 GHz. A battery 38 is provided and supported relative to substrate 32. Accordingly, such substrate constitutes a common substrate which supports chip 36, antenna 34, and battery 38. An exemplary microelectronic radio frequency communication device is disclosed in U.S. patent application Ser. No. 08/705,043, U.S. Pat. No. 0,130,602 which names James O'Toole, John R. Tuttle, Mark E. Tuttle, Tyler Lowrey, Kevin Devereaux, George Pax, Brian Higgins, Shu-Sun Yu, David Ovard and Robert Rotzoll as inventors, which was filed on Aug. 29, 1996, and is assigned to the assignee of this patent application.

Referring to FIG. 4, a liquid mixture or filled resin composition is provided as described above, and formed or coated over at least a portion of, and preferably the entirety of antenna 34, chip 36, and battery 38. Such is then cured into a solid mass or coating 40. In a preferred aspect, the curing is conducted at a temperature less than or equal to about 120° C. Even more preferred, in a communication system which incorporates a battery, lower curing temperatures of between about 40° C. and 80° C. could be utilized to reduce the possibility of adversely affecting battery electrolyte material, some of which can boil at temperatures above 92° C.

The above described coating compositions provide a desired degree of radio frequency transmissivity such that when incorporated into wireless communication devices, less of a radio frequency signal is dissipated than would otherwise be possible without the composition. Such is desirable from the standpoint of preserving the integrity and/or strength of a particular signal. For example, some wireless communication devices can utilize microwave backscatter as a means of communicating between separated locations. Having such a device encapsulated with a material which is formed in accordance with the invention can increase the efficiency with which a signal is passed to and from the device.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of forming a radio frequency identification device comprising:
   providing a circuit comprising a radio frequency receiver and transmitter;
   operably connecting an antenna with the circuit, the antenna being configured to receive and transmit at least one desired radio frequency; and
   coating the antenna and at least some of the circuit with a coating material comprising a resin having solid polymeric material therewithin, the resin having a first radio frequency transmissivity value and the polymeric material imparting a second radio frequency transmissivity value to the coating material which is greater than the first radio frequency transmissivity value.

2. The method of claim 1, wherein the solid polymeric material comprises an organic powder.

3. The method of claim 1, wherein the solid polymeric material comprises powdered polytetrafluoroethylene.

4. A radio frequency microelectronic device comprising:
   a substrate;
   integrated circuitry supported by the substrate and configured for radio frequency operation; and
   a solid mass disposed over the substrate and at least a portion of the integrated circuitry, the solid mass comprising a hardened resin composition having a suspension of organic polymer filler material dispersed therewithin, the solid mass having an RF dissipation factor lower than the solid mass would have absent the organic polymer filler material dispersed therewithin.

5. The radio frequency microelectronic device of claim 4 further comprising an antenna disposed over the substrate, the solid mass being disposed over the antenna.

6. The radio frequency microelectronic device of claims 4, wherein the organic polymer filler material comprises polytetrafluoroethylene.

7. The method of claim 1, wherein the resin comprises epoxy.

8. The method of claim 1, wherein the resin comprises urethane.

9. The method of claim 1, wherein the resin comprises acrylic.

10. The method of claim 1, wherein the resin comprises polyester.

11. The method of claim 1, wherein the resin comprises silicone.

12. The method of claim 1, wherein the solid polymeric material comprises fluorinated ethylene propylene.

13. The method of claim 1, wherein the solid polymeric material comprises polypropylene.

14. The method of claim 1, wherein the solid polymeric material comprises polystyrene.

15. The method of claim 1, wherein the solid polymeric, material comprises polybutylene.

16. The method of claim 1, wherein the resin composition comprises between about 10% to 90% by volume of the solid polymeric material.

17. The method of claim 1, wherein the resin composition comprises between about 40% to 70% by volume of the solid polymeric material.

18. The method of claim 1, wherein the coating comprises coating the entire circuit with the coating material.

19. The method of claim 1, wherein the at least one desired frequency comprises a frequency in a range between 1 GHz and 30 Ghz.

20. The method of claim 1, wherein the at least one desired frequency is about 2.45 Ghz.

21. The device of claim 4, wherein the resin comprises epoxy.

22. The device of claim 4, wherein the resin comprises urethane.

23. The device of claim 4, wherein the resin comprises acrylic.

24. The device of claim 4, wherein the resin comprises polyester.

25. The device of claim 4, wherein the resin comprises silicone.

26. The device of claim 4, wherein the filler material comprises fluorinated ethylene propylene.

27. The device of claim 4, wherein the filler material comprises polypropylene.

28. The device of claim 4, wherein the filler material comprises polystyrene.

29. The device of claim 4, wherein the filler material comprises polybutylene.

30. The device of claim 4, wherein the resin composition comprises between about 10% to 90% by volume of the filler material.

31. The device of claim 4, wherein the resin composition comprises between about 40% to 70% by volume of the filler material.

32. The device of claim 4, wherein the frequency operation is at at least one desired frequency in a range between 1 GHz and 30 Ghz.

33. The device of claim 4, wherein the frequency operation is at about 2.45 Ghz.

* * * * *

UNITED STATES PATENT AND TRADEMARK OFFICE
CERTIFICATE OF CORRECTION

PATENT NO. : 6,522,023 B2  Page 1 of 1
DATED : February 18, 2003
INVENTOR(S) : Rickie C. Lake It is certified that error appears in the above-identified patent and that said Letters Patent is hereby corrected as shown below:

<u>Title page,</u>
Item [57], ABSTRACT,
Line 8, replace "frequency. Transmissivity which is greater than that of the" with
-- frequency transmissivity which is greater than that of the --

<u>Column 1,</u>
Line 35, replace "which is are utilized to send and receive electronic signals" with
-- which are utilized to send and receive electronic signals --
Line 59, replace "have desirable radioi frequency transmissivity" with -- have desirable radio-frequency transmissivity --

<u>Column 4,</u>
Line 63, replace "6. The radio frequency microelectronic device of claims" with
-- 6. The radio frequency microelectronic device of claim --

Signed and Sealed this

Sixteenth Day of September, 2003

JAMES E. ROGAN
*Director of the United States Patent and Trademark Office*